United States Patent
Wu et al.

(10) Patent No.: US 10,663,650 B2
(45) Date of Patent: May 26, 2020

(54) LIGHTING DEVICE

(71) Applicants: RADIANT OPTO-ELECTRONICS (SUZHOU) CO., LTD, Suzhou, Jiangsu (CN); RADIANT OPTO-ELECTRONICS CORPORATION, Kaohsiung (TW)

(72) Inventors: Jui-Fang Wu, Kaohsiung (TW); Pin-Tsung Wang, Kaohsiung (TW); Ming-Huang Yang, Kaohsiung (TW)

(73) Assignees: RADIANT OPTO-ELECTRONICS (SUZHOU) CO., LTD, Jiangsu (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 1 day.

(21) Appl. No.: 16/111,144

(22) Filed: Aug. 23, 2018

(65) Prior Publication Data
US 2019/0094457 A1 Mar. 28, 2019

Related U.S. Application Data

(63) Continuation of application No. PCT/CN2017/103497, filed on Sep. 26, 2017.

(51) Int. Cl.
*F21V 8/00* (2006.01)
*F21V 15/01* (2006.01)
(Continued)

(52) U.S. Cl.
CPC ............ *G02B 6/0093* (2013.01); *F21V 15/01* (2013.01); *G02B 6/0075* (2013.01);
(Continued)

(58) Field of Classification Search
CPC .. G02B 6/0075; G02B 6/0088; G02B 6/0093; F21V 15/01; F21V 15/1712; F21V 15/164; F21Y 2103/10; F21Y 2115/10
See application file for complete search history.

(56) References Cited

U.S. PATENT DOCUMENTS 6,305,109 B1 * 10/2001 Lee ...................... G02B 6/0068
40/546
6,471,388 B1 * 10/2002 Marsh .................. G02B 6/0031
313/318.11
(Continued)

FOREIGN PATENT DOCUMENTS

CN 101839430 A 9/2010
CN 201652083 U 11/2010
(Continued)

OTHER PUBLICATIONS

English Machine Translation of KR 20170041122 provided by Espacenet (Year: 2017).*
Taiwan Patent Office, Office Action, Patent Application Serial No. 106133613, dated Mar. 23, 2018, Taiwan.
WIPO ISO, International Search Report, Applicaiton No. PCT/CN2017/103497, dated Jun. 15, 2018, China.

*Primary Examiner* — Zheng Song (57) ABSTRACT

A lighting device is provided, including a housing, a light source module, a light guiding module, and a protective member. The housing has an accommodating space, and the light source module is disposed in the accommodating space. The light guiding module has a top surface, a bottom surface opposite to the top surface, a first lateral surface, and a second lateral surface opposite to the first lateral surface. The light from the light source module can be received by the top surface. The first and second lateral surfaces connect the top surface to the bottom surface. The protective member surrounds the first lateral surface, the bottom surface, and the second lateral surface. The opposite ends of the protective member are connected to the housing.

22 Claims, 10 Drawing Sheets

(51) Int. Cl.
*F21V 17/16* (2006.01)
*F21Y 115/10* (2016.01)
*F21V 17/12* (2006.01)
*F21Y 103/10* (2016.01)

(52) U.S. Cl.
CPC ............ *G02B 6/0088* (2013.01); *F21V 17/12* (2013.01); *F21V 17/164* (2013.01); *F21Y 2103/10* (2016.08); *F21Y 2115/10* (2016.08)

(56) References Cited

U.S. PATENT DOCUMENTS

| | | | | |
|---|---|---|---|---|
| 2008/0285274 | A1* | 11/2008 | Jung | F21S 8/032 362/240 |
| 2012/0281432 | A1* | 11/2012 | Parker | F21V 29/70 362/609 |
| 2013/0088890 | A1* | 4/2013 | Knapp | G09F 13/22 362/609 |
| 2013/0265784 | A1* | 10/2013 | Nieberle | F21S 8/00 362/382 |
| 2014/0016352 | A1* | 1/2014 | He | G02B 6/0091 362/612 |
| 2014/0063847 | A1* | 3/2014 | Sakamoto | G02B 6/0031 362/609 |
| 2016/0356436 | A1* | 12/2016 | Blessitt | F21S 8/00 |

FOREIGN PATENT DOCUMENTS

| | | | |
|---|---|---|---|
| CN | 103016972 | A | 4/2013 |
| CN | 203325389 | U | 12/2013 |
| CN | 203338703 | U | 12/2013 |
| CN | 203478059 | U | 3/2014 |
| CN | 204083944 | U | 1/2015 |
| CN | 205690198 | U | 11/2016 |
| KR | 100968088 | B1 | 7/2010 |
| KR | 20170041122 | * | 4/2017 ............ G09F 13/22 |
| KR | 20170041122 | A | 4/2017 |
| TW | 200900635 | A | 1/2009 |
| TW | M453086 | U | 5/2013 |
| TW | 201619551 | A | 6/2016 |
| TW | 201721202 | A | 6/2017 |

\* cited by examiner

LIGHTING DEVICE

CROSS REFERENCE TO RELATED APPLICATIONS

This application is a continuation application of International Application No. PCT/CN2017/103497, filed Sep. 26, 2017, the entirety of which is incorporated by reference herein.

BACKGROUND OF THE INVENTION

Field of the Invention

The application relates in general to a lighting device, and in particular, to a lighting device that has a protective member.

Description of the Related Art

In some of the current lighting devices, a light source module is disposed in a housing, and a light guiding module is hung below the housing. However, the light guiding module may separate from the housing due to a sway or a collision during transportation when using a normal hanging method.

For preventing the aforementioned condition, a plurality of holes may be formed on the light source module in some lighting devices. A positioning pillar can pass through the housing and the holes to prevent the light guiding module from falling. However, a shadow is cast in a position that is adjacent to the positioning pillar, and the processing time and the cost are increased due to the formation of the holes on the light source module. Thus, how to address the aforementioned problem has become an important issue.

BRIEF SUMMARY OF INVENTION

To address the deficiencies of conventional products, an embodiment of the invention provides a lighting device, including a housing, a light source module, a light guiding module, and a protective member. The housing has an accommodating space, and the light source module is disposed in the accommodating space. The light guiding module has a top surface, a bottom surface opposite to the top surface, a first lateral surface, and a second lateral surface opposite to the first lateral surface. The light from the light source module can be received by the top surface. The first and second lateral surfaces connect the top surface to the bottom surface. The protective member surrounds the first lateral surface, the bottom surface, and the second lateral surface. The opposite ends of the protective member are connected to the housing.

In some embodiments, the lighting device further comprises two auxiliary buckles, respectively disposed on the connection portion between the first lateral surface and the bottom surface, and the connection portion between the second lateral surface and the bottom surface, wherein the protective member is restricted by the auxiliary buckles.

In some embodiments, each of the auxiliary buckles has an auxiliary recess, and a portion of the light guiding module is accommodated in the auxiliary recess.

In some embodiments, each of the auxiliary buckles has an auxiliary groove, and the protective member is accommodated in the auxiliary groove.

In some embodiments, the light guiding module comprises a plurality of light guiding plates, and the lighting device further comprises at least one bridging buckle connected to the adjacent light guiding plates, wherein the protective member is restricted by the bridging buckle.

In some embodiments, the bridging buckle has a bridging recess, and a portion of the light guiding module is accommodated in the bridging recess.

In some embodiments, the bridging buckle has a bridging groove, and the protective member is accommodated in the bridging groove.

In some embodiments, the housing has a groove, and the lighting device further comprises a restricting member, wherein the width of the restricting member is greater than the width of the groove, and one of the ends of the protective member is connected to the restricting member through the groove.

In some embodiments, the housing further comprises a through hole that communicates with the groove, and the restricting member can pass through the through hole.

In some embodiments, the lighting device further comprises a locking member, and the housing further comprises a main body and a side plate, wherein the through hole and the groove are formed on the side plate, and the locking member can pass through the through hole to affix the side plate to the main body.

In some embodiments, the lighting device further comprises a locking member and an annular member, and the housing further comprises a main body and a side plate affixed to the main body by the locking member, wherein the annular member sleeves on the locking member, and the protective member is connected to the annular member.

In some embodiments, the light guiding module comprises at least one depression portion, and the lighting device further comprises at least one positioning pillar extending through the depression portion.

In some embodiments, the depression portion is adjacent to the first lateral surface and/or the second lateral surface.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the lighting device are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
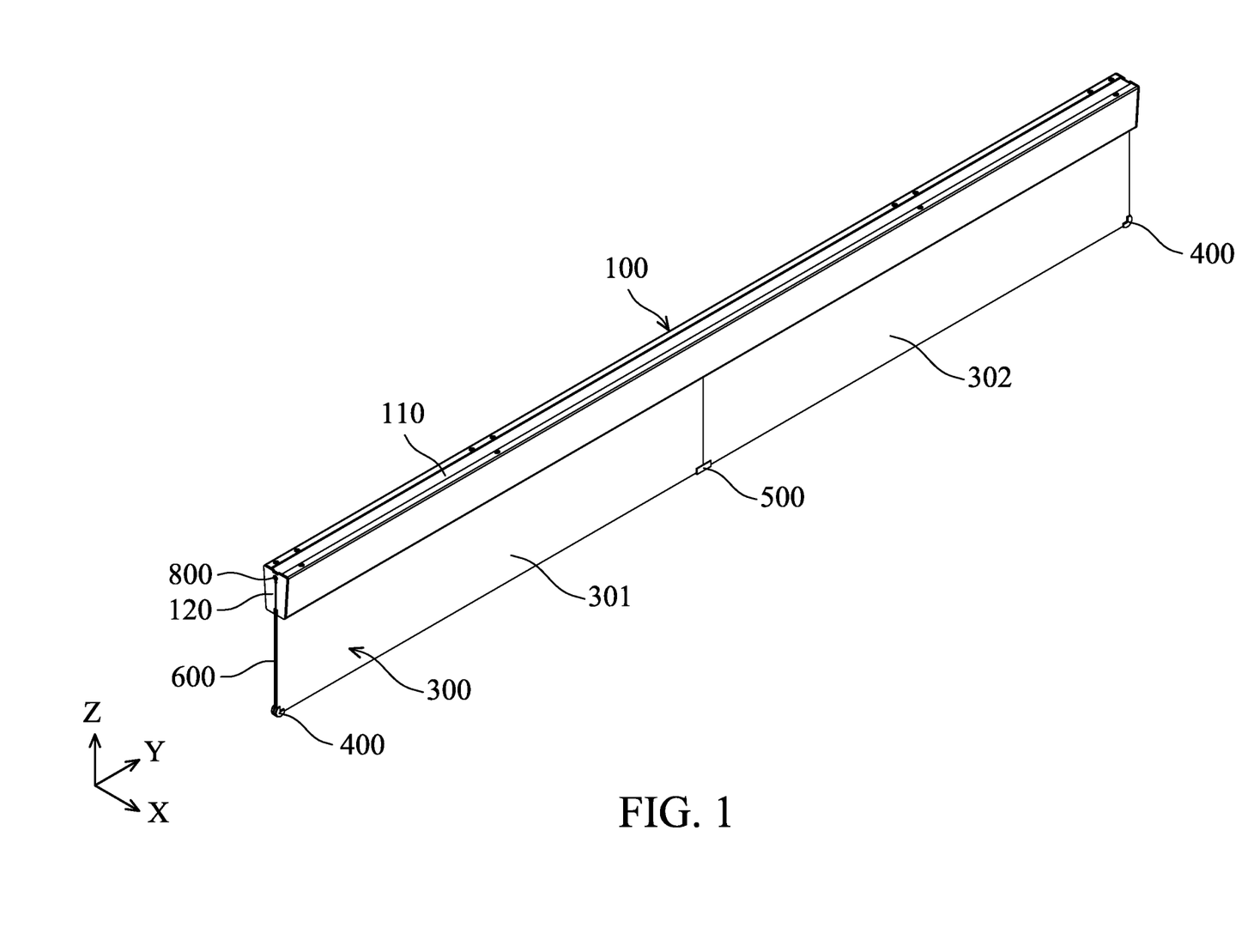
FIG. 1 is a schematic diagram of a lighting device according to an embodiment of the invention.
Figure 2:
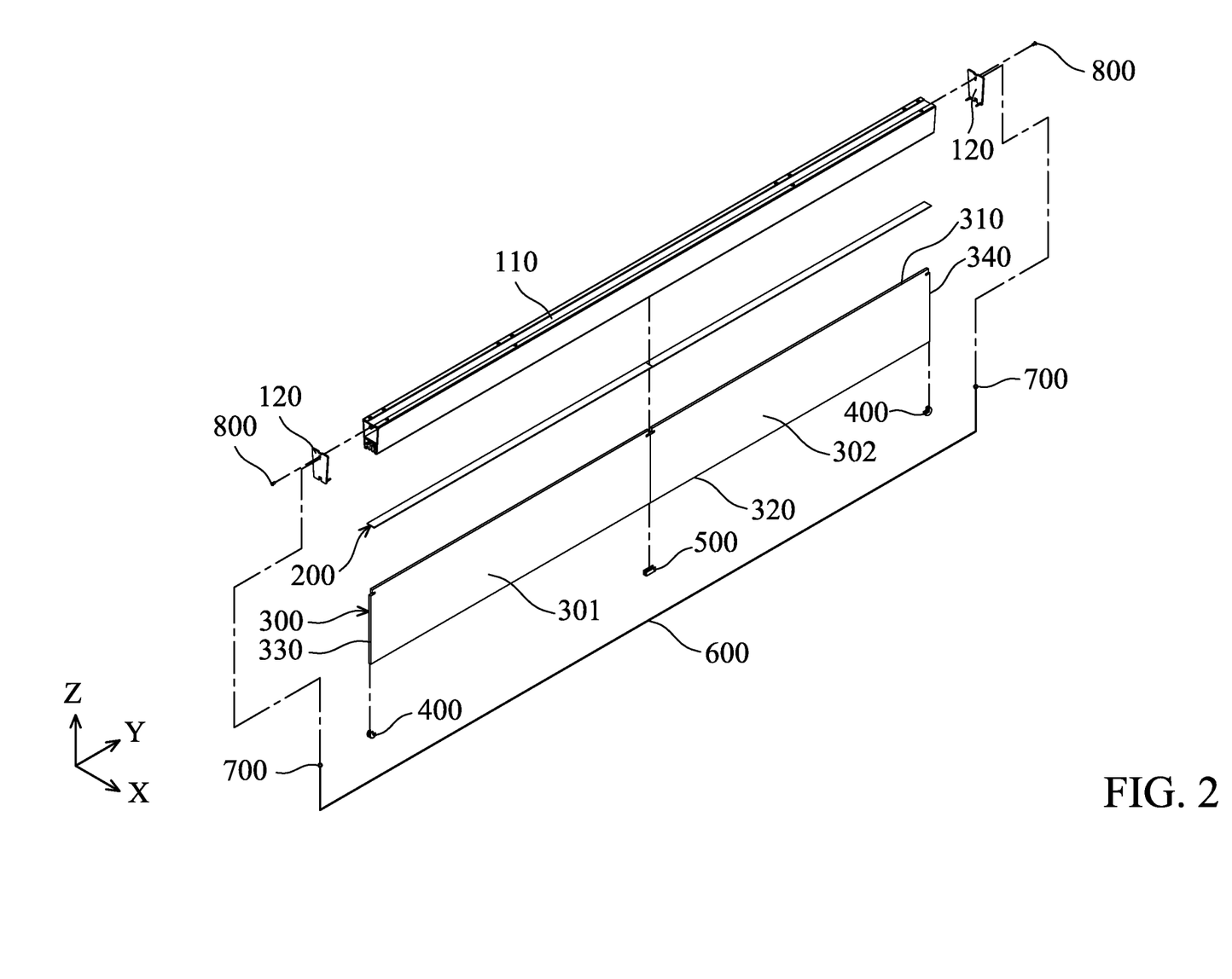
FIG. 2 is an exploded-view diagram of the lighting device according to an embodiment of the invention.

FIG. 1 is a schematic diagram of a lighting device according to an embodiment of the invention, and FIG. 2 is an exploded-view diagram of the aforementioned lighting device. As shown in FIGS. 1 and 2, the lighting device primarily comprises a housing 100, a light source module 200, a light guiding module 300, two auxiliary buckles 400, a bridging buckle 500, a protective member 600, at least one restricting member 700, and at least one locking member 800.

Figure 3:
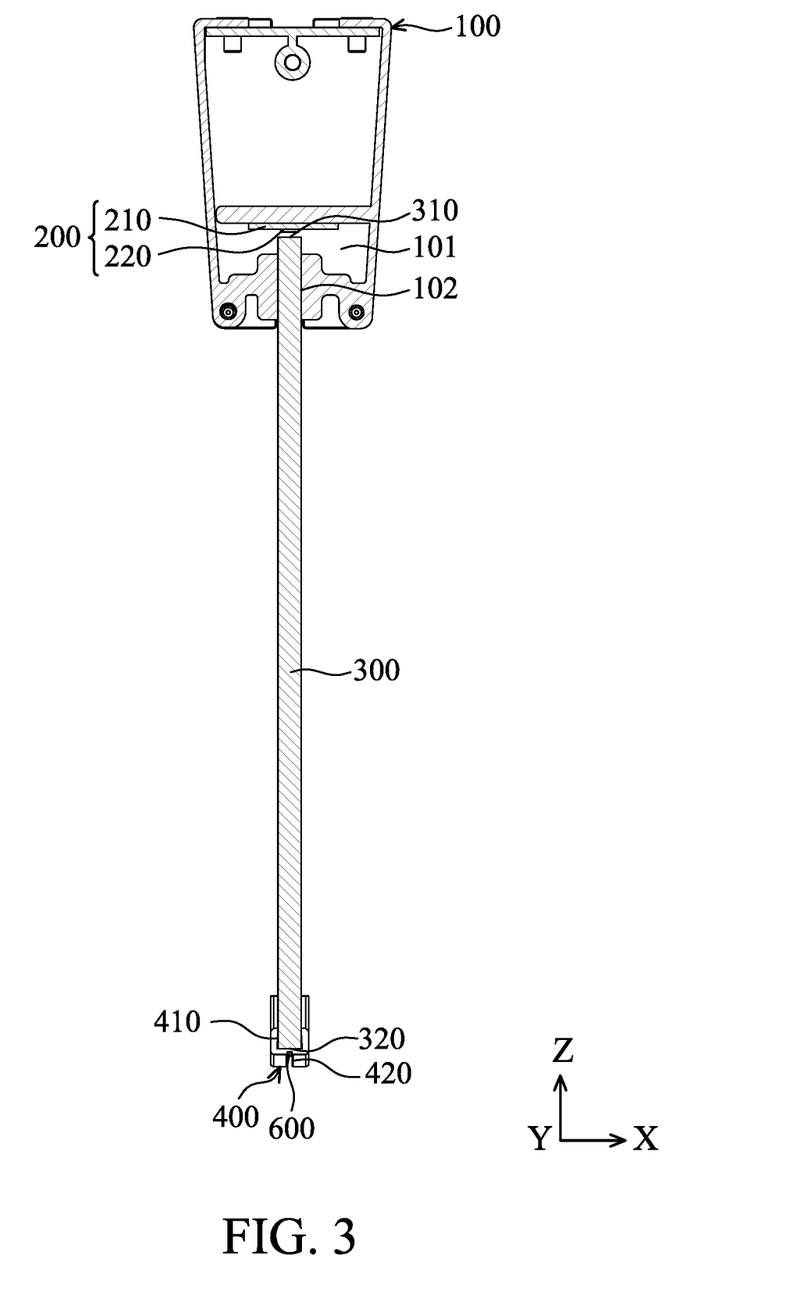
FIG. 3 is a cross-sectional view of the lighting device in FIG. 1.

Referring to FIGS. 2 and 3, the housing 100 has an accommodating space 101 and a passage 102, wherein the passage 102 communicates the accommodating space 101 and the external environment. The light source module 200 is disposed in the accommodating space 101, and the light guiding module 300 enters the accommodating space 101 through the passage 102. Since the width of the passage 102 is substantially the same as the thickness of the light guiding module 300, the housing 100 can provide a clamping force to the light guiding module 300 when the light guiding module 300 passes through the passage 102.

Figure 4:
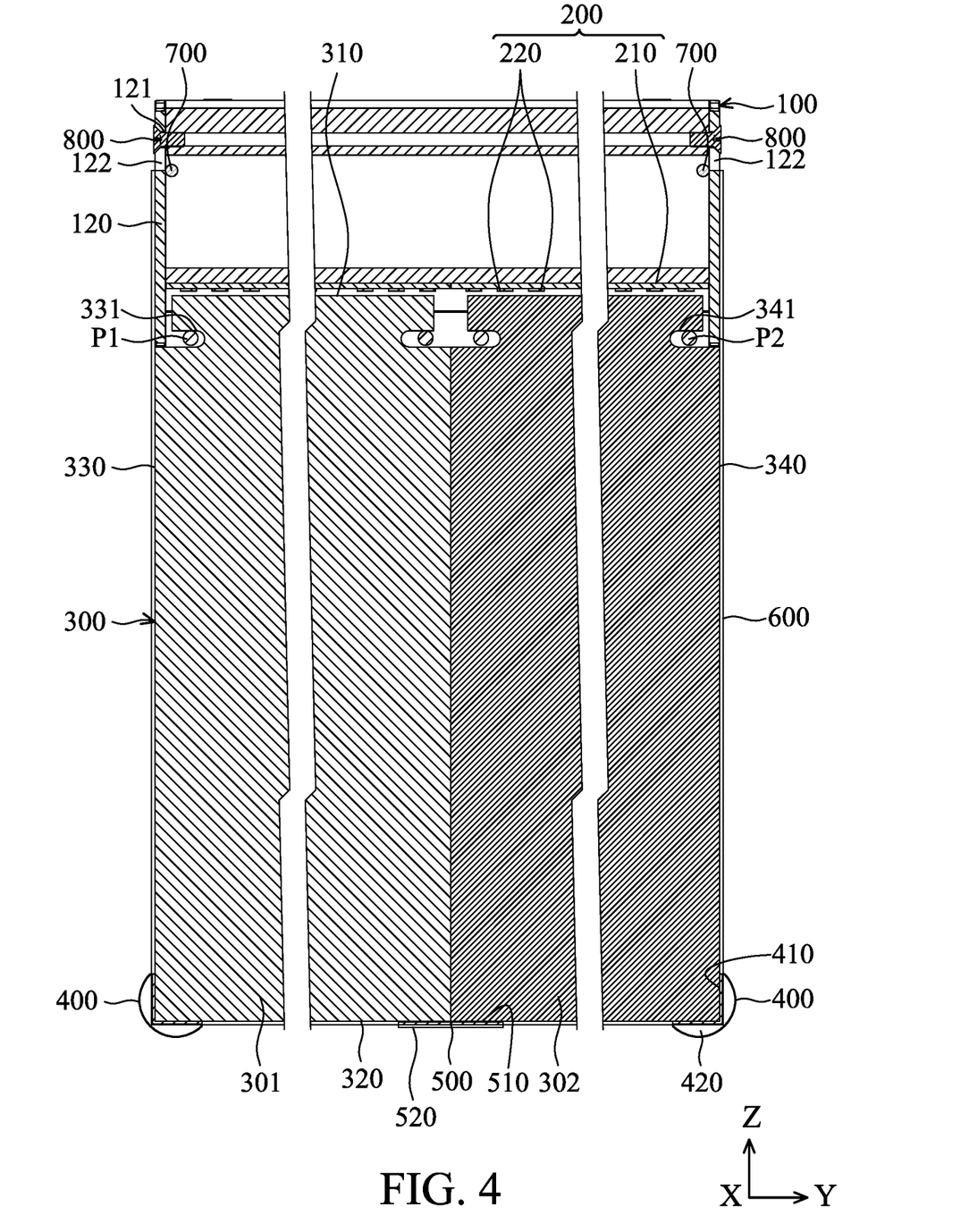
FIG. 4 is a cross-sectional view of the lighting device in FIG. 1.

As shown in FIGS. 2-4, the light source module 200 comprises a circuit board 210 and a plurality of light emitting diodes 220, and the light guiding module 300 has a top surface 310, a bottom surface 320, a first lateral surface 330 and a second lateral surface 340. The top surface 310 is opposite to the bottom surface 320, the first lateral surface 330 is opposite to the second lateral surface 340, and the first and second lateral surface 330 and 340 connect the top surface 310 to the bottom surface 320. In this embodiment, the top surface 310 of the light guiding module 300 is accommodated in the accommodating space 101 of the housing 100, and faces and corresponds to the light emitting diodes 220. Therefore, the light generated from the light emitting diodes 220 can be received by the top surface 310 of the light guiding module 300.

A depression portion 331 adjacent to the top surface 310 can be formed on the first lateral surface 330 of the light guiding module 300, and a positioning pillar P1 can be extended through the depression portion 331. Similarly, a depression portion 341 adjacent to the top surface 310 can be formed on the second lateral surface 340, and a positioning pillar P2 can be extended through the depression portion 341. Thus, the light guiding module 300 can be hung below the housing 100 by the depression portions 331 and 341 and the positioning pillars P1 and P2. In some embodiments, the light guiding module 300 can be hung by the depression portions 331 and 341 and the positioning pillars P1 and P2 without the clamp of the housing 100.

Referring to FIGS. 2-5, two auxiliary buckles 400 are respectively disposed on a connection portion between the first lateral surface 330 and the bottom surface 320, and a connection portion between the second lateral surface 340 and the bottom surface 320. Each of the auxiliary buckles 400 has an auxiliary recess 410 and an auxiliary groove 420. The auxiliary recess 410 has a L-shaped structure, and its width is slightly less than or substantially the same as the thickness of the light guiding module 300. Since each of the auxiliary buckles 400 in this embodiment is flexible, the corner of the light guiding module 300 can be accommodated in the auxiliary recess 410 and clamped by the auxiliary buckle 400 when the auxiliary buckle 400 is assembled on the light guiding module 300. Furthermore, when the auxiliary buckle 400 is assembled on the light guiding module 300, the auxiliary recess 410 is disposed between the light guiding module 300 and the auxiliary groove 420.

Figure 6:
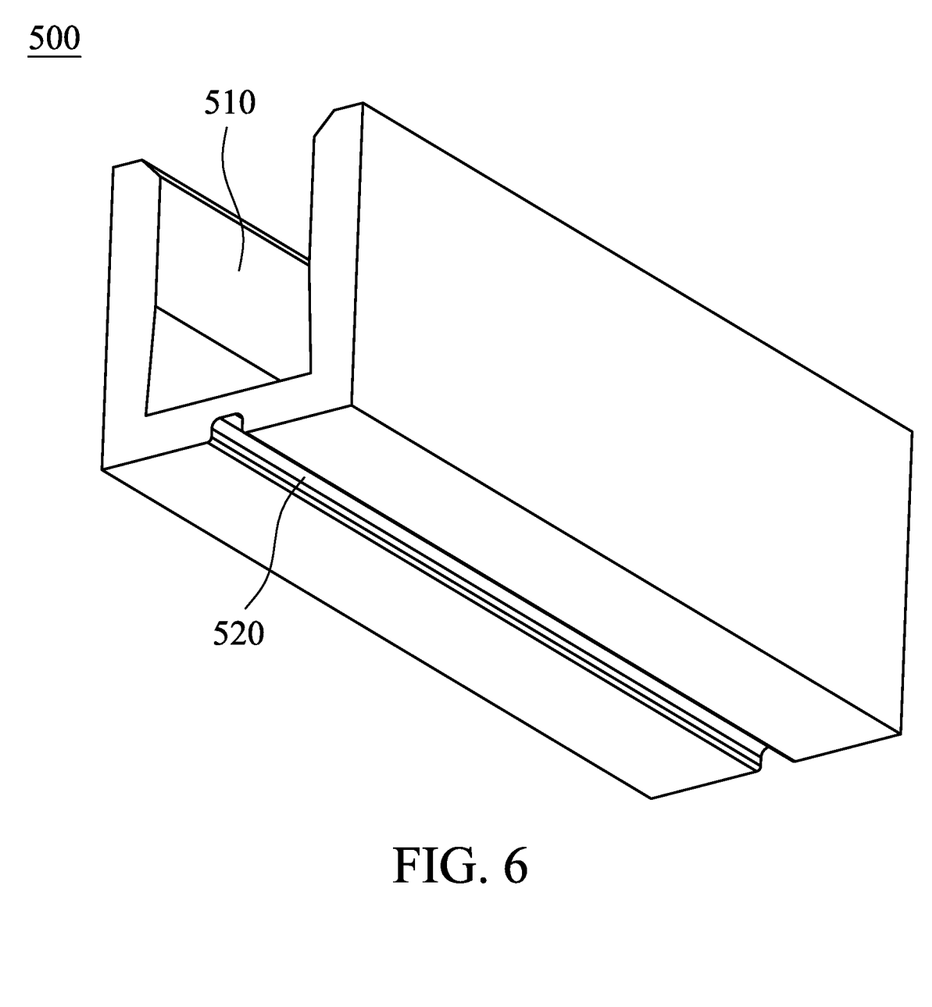
FIG. 6 is a schematic diagram of a bridging buckle according to an embodiment of the invention.

In some embodiments, the light guiding module 300 comprises a plurality of light guiding plates (for example, the light guiding module 300 comprises two light guiding plates 301 and 302 in this embodiment). The bridging buckle 500 can be disposed between these light guiding plates to prevent a relative displacement from being generated between the light guiding plates. Referring to FIGS. 4 and 6, like the auxiliary buckle 400, the bridging buckle 500 comprises a bridging recess 510 and a bridging groove 520. A portion of the light guiding plate 301 is accommodated in the bridging recess 510, and a portion of the light guiding plate 302 is also accommodated in the bridging recess 510. The width of the bridging recess 510 is slightly less than or substantially the same as the thickness of the light guiding module 300, and the bridging buckle 500 is flexible. Therefore, when the bridging buckle 500 is assembled on the light guiding module 300, the bridging buckle 500 clamps the light guiding plates 301 and 302. Furthermore, when the bridging buckle 500 is assembled on the light guiding module 300, the bridging recess 510 is disposed between the light guiding module 300 and the bridging groove 520.

It should be noted that, the numbers of the bridging buckles 500 can be increased or omitted as required. For example, in an embodiment where the light guiding module 300 merely has one light guiding plate, the bridging buckle 500 can be omitted.

Turn back to FIG. 4, the protective member 600 can be an elastic string, for example, it can comprise nylon, carbon fiber and/or polyethylene. The opposite ends of the protective member 600 connect the restricting members 700. In this embodiment, each of the restricting members 700 has a ball-shaped structure.

Figure 7:
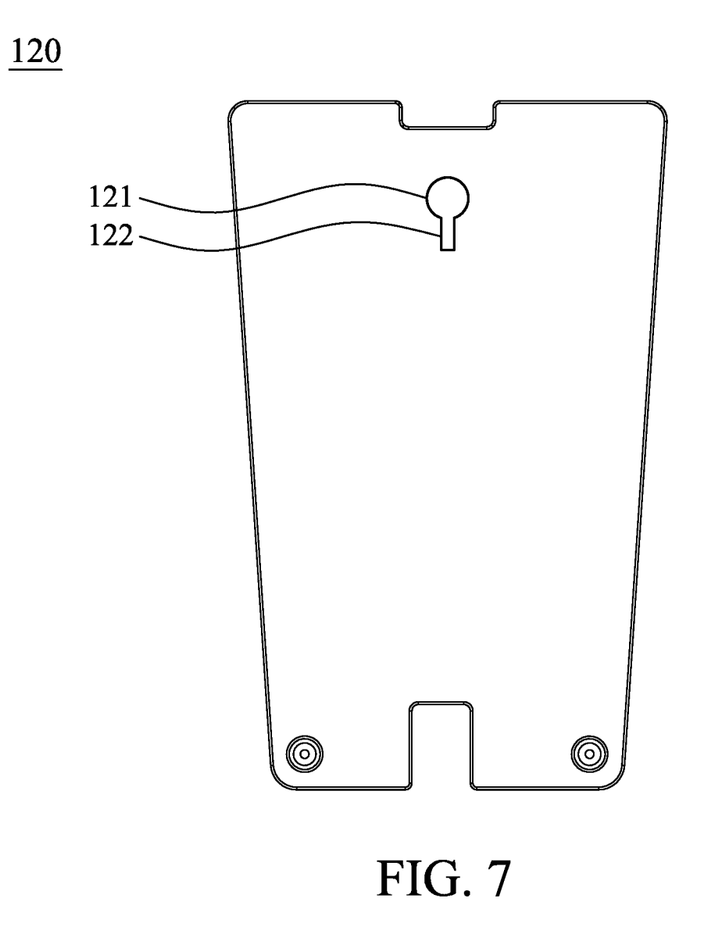
FIG. 7 is a schematic diagram of a side plate according to an embodiment of the invention.

It should be noted that, as shown in FIGS. 2, 4 and 7, in this embodiment, the housing 100 comprises a main body 110 and at least one side plate 120, wherein a through hole 121 and a groove 122 that communicates with the through hole 121 are formed on the side plate 120. The groove 122 is disposed between the through hole 121 and the light guiding module 300, and its width is less than the width of the restricting member 700 and greater than or the same as the string diameter of the protective member 600. The dimensions of the through hole 121 are greater than or the same as that of the restricting member 700.

Figure 8A:
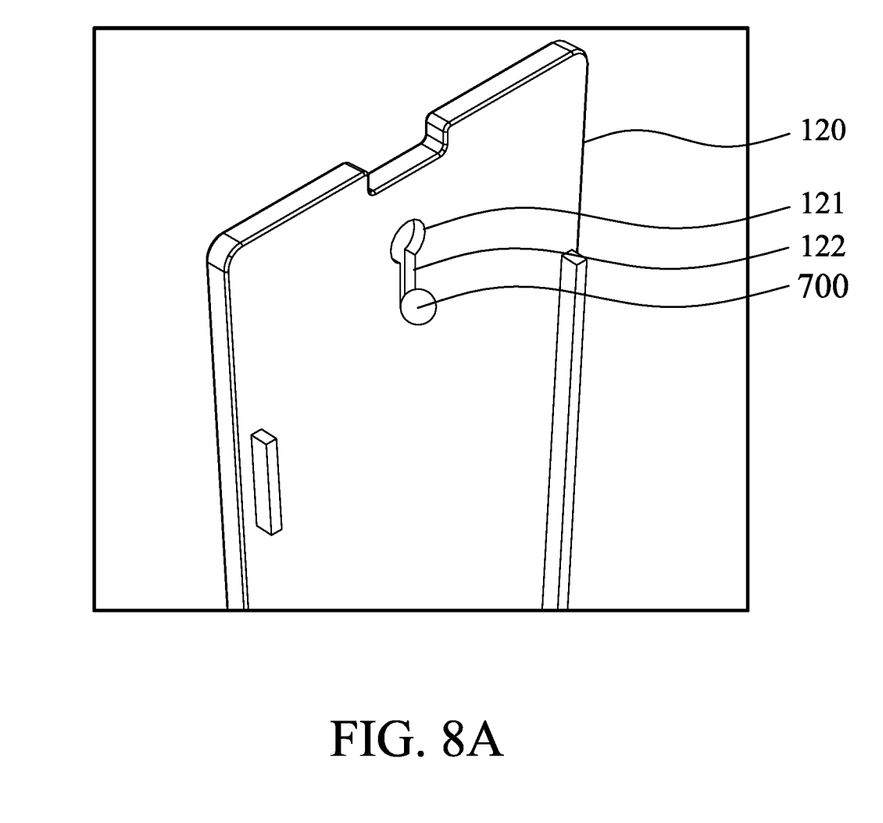
FIG. 8A is a schematic diagram of the side plate and a restricting member according to an embodiment of the invention.

In this embodiment, the housing 100 comprises two side plates 120 respectively assembled on the opposite sides of the main body 110. Before the protective member 600 is assembled, the restricting member 700 disposed on one end of the protective member 600 can pass through the through hole 121 of one of the side plates 120 and enter the accommodated space 101 of the housing 100. Consequently, the restricting member 700 falls and the protective member 600 enters the groove 122 (as shown in FIGS. 4 and 8A). Since the end of the protective member 600 is connected to the restricting member 700 through the groove 122, and the width of the restricting member 700 is greater than that of the groove 122, the end of the protective member 600 can be affixed to the side plate 120 of the housing 100.

Figure 8B:
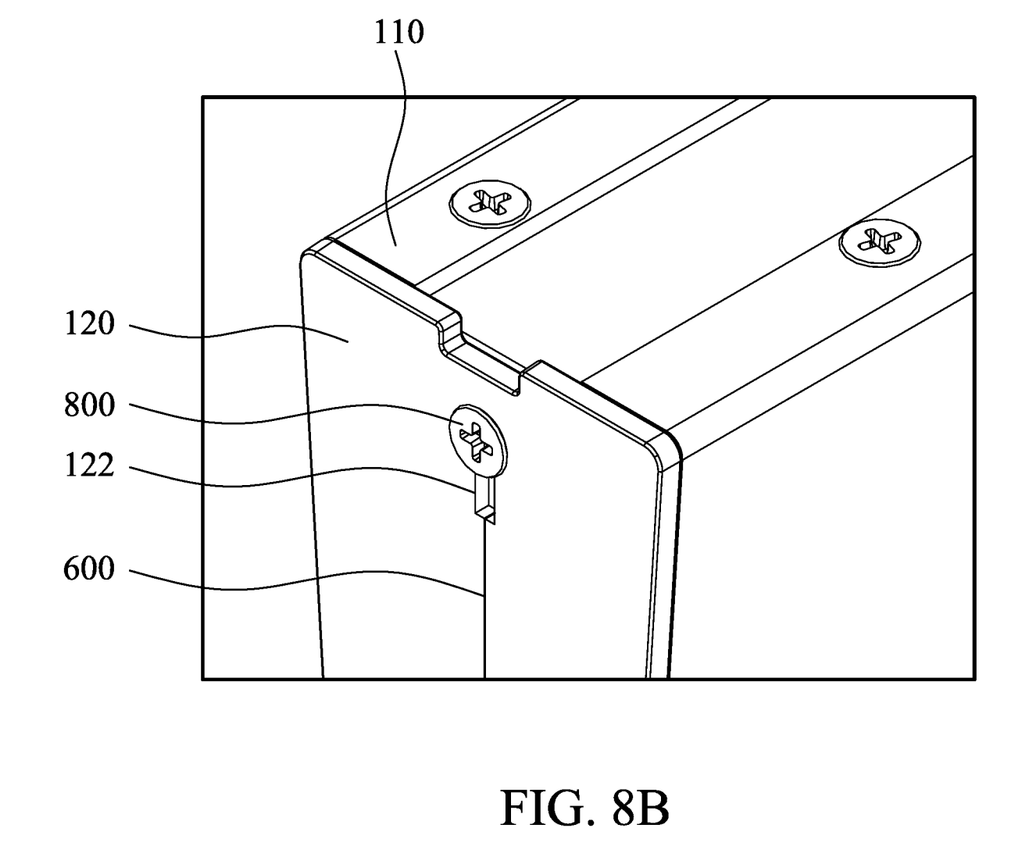
FIG. 8B is a partial schematic diagram of the lighting device according to an embodiment of the invention.

As shown in FIGS. 4 and 8B, the locking member 800 can then pass through the through hole 121 to affix the side plate 120 to the main body 110. Therefore, the through hole 121 is sealed by the locking member 800. Even if the restricting member 700 slides toward the through hole 121 during transportation, it cannot slide out of the through hole 121 and cause the protective member 600 to fall.

Next, the protective member 600 can be extended along the longitudinal axis of the first lateral surface 300, the longitudinal axis of the bottom surface 320, and the longitudinal axis of the second lateral surface 340 in sequence. The other end of the protective member 600 can be affixed to the housing 100 by the same method described above. In other words, when the protective member 600 is assembled, it surrounds the first lateral surface 330, the bottom surface 320, and the second lateral surface 340 of the light guiding module 300. Thus, when the positioning pillars P1 and P2 or the portions of the light guiding module 300 adjacent to the depression portion 331 and 341 is broken, the protective member 600 still can provide enough supporting force to prevent the light guiding module 300 from falling.

Since the string diameter of the bendable string of the protective member 600 is less than the width of the first lateral surface 300, the width of the bottom surface 320, and the width of the second lateral surface 340, the protective member 600 can partially cover the first lateral surface 300, the bottom surface 320, and the second lateral surface 340. In other words, the most of the regions of the first lateral surface 300, the bottom surface 320, and the second lateral surface 340 are exposed.

Figure 5:
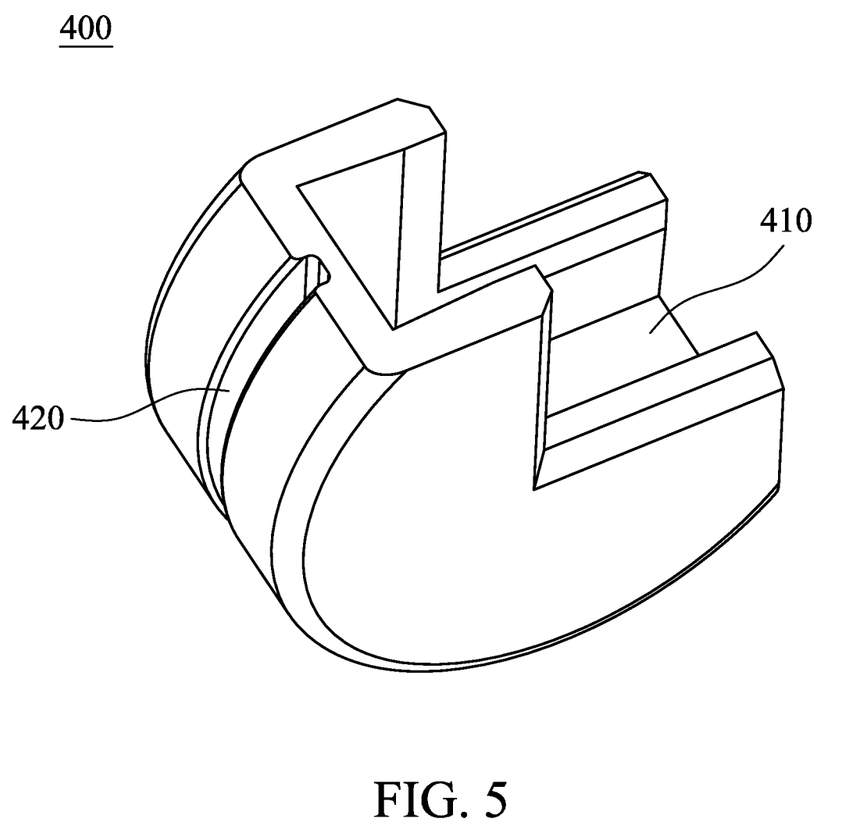
FIG. 5 is a schematic diagram of an auxiliary buckle according to an embodiment of the invention.

In this embodiment, the protective member 600 contacts the auxiliary buckle 400 and the bridging buckle 500, and is accommodated in the auxiliary groove 420 and the bridging groove 520. Therefore, the protective member 600 can be restricted by the auxiliary groove 420 and the bridging groove 520, so as to ensure that the protective member 600 can provide a supporting force to the light guiding module 300 despite sliding or movement. Furthermore, the auxiliary buckle 400 and the bridging buckle 500 can form a gap between the protective member 600 and the light guiding module 300, so as to prevent the wear of the light guiding module 300 caused by protective member 600. In this embodiment, the width of the auxiliary groove 420 and the width of the bridging groove 520 is substantially the same as the string diameter of the protective member 600.

The total length of the protective member 600 is substantially the same as the perimeter of the light guiding module 300 minus the length of the top surface 310 and plus the distance between the top surface 310 and the groove 122. Since the protective member 600 is extensible, when the end of the protective member 600 is affixed, the user can apply a small pulling force to pass the restricting member 700 on the other end of protective member 600 through the through hole 121 of the side plate 120. When the opposite ends of the protective member 600 surrounds the first lateral surface 300, the bottom surface 320, and the second lateral surface 310 of the light guiding module 300, it can provide an enough force to support the light guiding module 300.

In some embodiments, the positioning pillars P1 and P2 and the depression portions 331 and 341 of the light guiding module 300 can be omitted, and the protective member 600 can be used to support the light guiding module 300. Thus, the shadow generated by the positioning pillars P1 and P2 can be removed. In some embodiments, the auxiliary buckle 400 and the bridging buckle 500 can be omitted, and the protective member 600 contacts the first lateral surface 330, the bottom surface 320, and the second lateral surface 340 of the light guiding module 300 directly. Therefore, the dimensions of the lighting device can be reduced.

Figure 9:
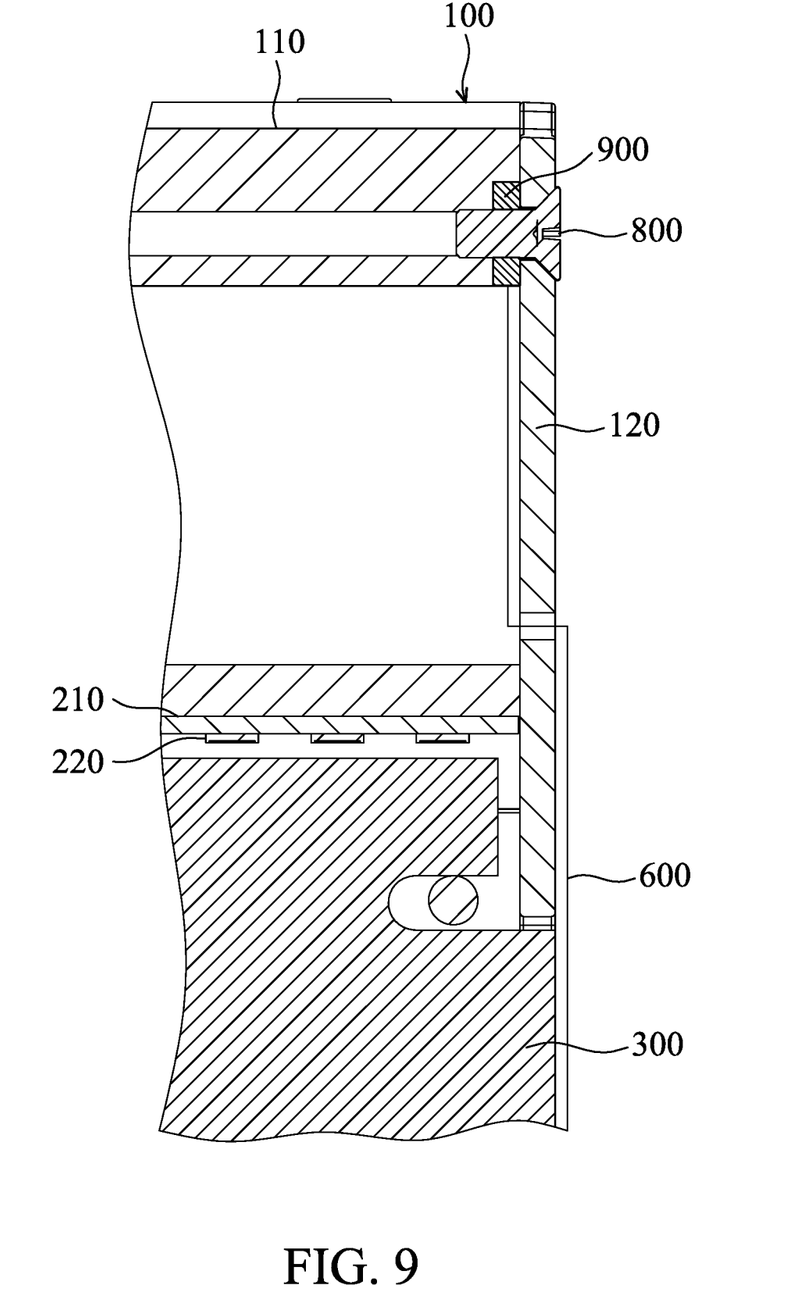
FIG. 9 is a partial schematic diagram of a lighting device according to another embodiment of the invention.

In some embodiments, the opposite ends of the protective member 600 can be affixed to the housing 100 by another method. For example, referring to FIG. 9, in another embodiment of the invention, the end of the protective member 600 is connected to an annular member 900. When the locking member 800 passes through the through hole 121 to affix the side plate 120 to the main body 110, the locking member 800 passes through the annular member 900. The annular member 900 sleeves on the locking member 800, and the end of the protective member 600 can be affixed to the housing 100.

In some embodiments, the opposite ends of the protective member 600 can be directly affixed to the restricting member 700 by welding or insert molding.

In summary, a lighting device is provided. Owing to the protective member surrounding the first lateral surface, the bottom surface, and the second lateral surface of the light guiding module in the lighting device, the light guiding module can be supported and prevented from falling. Furthermore, shadows cast by the positioning pillar or the depression portion on the light guiding module can be prevented.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A lighting device, comprising:
   a housing, having an accommodating space;
   a light source module, disposed in the accommodating space;
   a light guiding module, comprising:
      a top surface, receiving the light from the light source module;
      a bottom surface, opposite to the top surface;
      a first lateral surface, connected to the top surface and the bottom surface; and
      a second lateral surface, opposite to the first lateral surface, and connected to the top surface and the bottom surface; and
   a protective member, surrounding the first lateral surface, the bottom surface, and the second lateral surface, and the opposite ends of the protective member are connected to the housing,
   wherein the protective member is a bendable string, the string diameter of the bendable string is less than the width of the first lateral surface, the width of the bottom surface, and the width of the second lateral surface, and the first lateral surface, the bottom surface, and the second lateral surface are partially covered by the protective member.

2. The lighting device as claimed in claim 1, wherein the lighting device further comprises two auxiliary buckles, respectively disposed on a connection portion between the first lateral surface and the bottom surface, and a connection portion between the second lateral surface and the bottom surface, wherein the protective member is restricted by the auxiliary buckles.

3. The lighting device as claimed in claim 2, wherein each of the auxiliary buckles has an auxiliary recess, and a portion of the light guiding module is accommodated in the auxiliary recess.

4. The lighting device as claimed in claim 2, wherein each of the auxiliary buckles has an auxiliary groove, and the protective member is accommodated in the auxiliary groove.

5. The lighting device as claimed in claim 1, wherein the light guiding module comprises a plurality of light guiding plates, and the lighting device further comprises at least one bridging buckle connected to the adjacent light guiding plates, wherein the protective member is restricted by the bridging buckle.

6. The lighting device as claimed in claim 5, wherein the bridging buckle has a bridging recess, and a portion of the light guiding module is accommodated in the bridging recess.

7. The lighting device as claimed in claim 5, wherein the bridging buckle has a bridging groove, and the protective member is accommodated in the bridging groove.

8. The lighting device as claimed in claim 1, wherein the housing has a groove, and the lighting device further comprises a restricting member, wherein the width of the restricting member is greater than the width of the groove, and one of the ends of the protective member is connected to the restricting member through the groove.

9. The lighting device as claimed in claim 8, wherein the housing further comprises a through hole that communicates with the groove, and the restricting member can pass through the through hole.

10. The lighting device as claimed in claim 9, wherein the lighting device further comprises a locking member, and the housing further comprises a main body and a side plate, wherein the through hole and the groove are formed on the side plate, and the locking member can pass through the through hole to affix the side plate to the main body.

11. The lighting device as claimed in claim 1, wherein the lighting device further comprises a locking member and an annular member, and the housing further comprises a main body and a side plate affixed to the main body by the locking member, wherein the annular member sleeves on the locking member, and the protective member is connected to the annular member.

12. The lighting device as claimed in claim 1, wherein the light guiding module comprises at least one depression portion, and the lighting device further comprises at least one positioning pillar extending through the depression portion.

13. The lighting device as claimed in claim 12, wherein the depression portion is adjacent to the first lateral surface and/or the second lateral surface.

14. A lighting device, comprising:
    a housing, having an accommodating space;
    a light source module, disposed in the accommodating space;
    a light guiding module, comprising:
       a top surface, receiving the light from the light source module;
       a bottom surface, opposite to the top surface;
       a first lateral surface, connected to the top surface and the bottom surface; and
       a second lateral surface, opposite to the first lateral surface, and connected to the top surface and the bottom surface; and
    a protective member, surrounding the first lateral surface, the bottom surface, and the second lateral surface, and the opposite ends of the protective member are connected to the housing;
    wherein the lighting device further comprises two auxiliary buckles, respectively disposed on a connection portion between the first lateral surface and the bottom surface, and a connection portion between the second lateral surface and the bottom surface, wherein the protective member is restricted by the auxiliary buckles;
    wherein each of the auxiliary buckles has an auxiliary recess, and a portion of the light guiding module is accommodated in the auxiliary recess.

15. The lighting device as claimed in claim 14, wherein the light guiding module comprises a plurality of light guiding plates, and the lighting device further comprises at least one bridging buckle connected to the adjacent light guiding plates, wherein the protective member is restricted by the bridging buckle.

16. The lighting device as claimed in claim 15, wherein the bridging buckle has a bridging recess, and a portion of the light guiding module is accommodated in the bridging recess.

17. The lighting device as claimed in claim 15, wherein the bridging buckle has a bridging groove, and the protective member is accommodated in the bridging groove.

18. A lighting device, comprising:
    a housing, having an accommodating space;
    a light source module, disposed in the accommodating space;
    a light guiding module, comprising:
       a top surface, receiving the light from the light source module;
       a bottom surface, opposite to the top surface;
       a first lateral surface, connected to the top surface and the bottom surface; and a second lateral surface, opposite to the first lateral surface, and connected to the top surface and the bottom surface; and
a protective member, surrounding the first lateral surface, the bottom surface, and the second lateral surface, and the opposite ends of the protective member are connected to the housing;
wherein the lighting device further comprises two auxiliary buckles, respectively disposed on a connection portion between the first lateral surface and the bottom surface, and a connection portion between the second lateral surface and the bottom surface, wherein the protective member is restricted by the auxiliary buckles;
wherein each of the auxiliary buckles has an auxiliary groove, and the protective member is accommodated in the auxiliary groove.

19. The lighting device as claimed in claim 18, wherein the light guiding module comprises a plurality of light guiding plates, and the lighting device further comprises at least one bridging buckle connected to the adjacent light guiding plates, wherein the protective member is restricted by the bridging buckle.

20. The lighting device as claimed in claim 19, wherein the bridging buckle has a bridging recess, and a portion of the light guiding module is accommodated in the bridging recess.

21. The lighting device as claimed in claim 19, wherein the bridging buckle has a bridging groove, and the protective member is accommodated in the bridging groove.

22. A lighting device, comprising:
a housing, having an accommodating space;
a light source module, disposed in the accommodating space;
a light guiding module, comprising:
a top surface, receiving the light from the light source module;
a bottom surface, opposite to the top surface;
a first lateral surface, connected to the top surface and the bottom surface; and
a second lateral surface, opposite to the first lateral surface, and connected to the top surface and the bottom surface; and
a protective member, surrounding the first lateral surface, the bottom surface, and the second lateral surface, and the opposite ends of the protective member are connected to the housing;
wherein the lighting device further comprises a locking member and an annular member, and the housing further comprises a main body and a side plate affixed to the main body by the locking member, wherein the annular member sleeves on the locking member, and the protective member is connected to the annular member.

* * * * *